March 30, 1943. N. E. WAHLBERG ET AL 2,315,467
DRIVE SHAFT CENTER BEARING
Filed Sept. 11, 1941 2 Sheets-Sheet 2
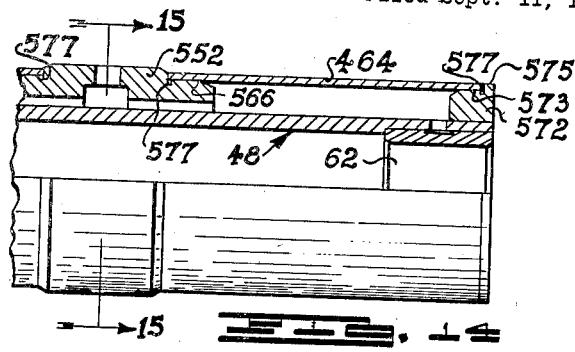
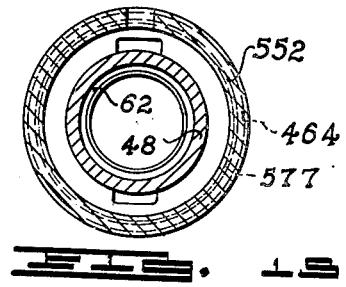
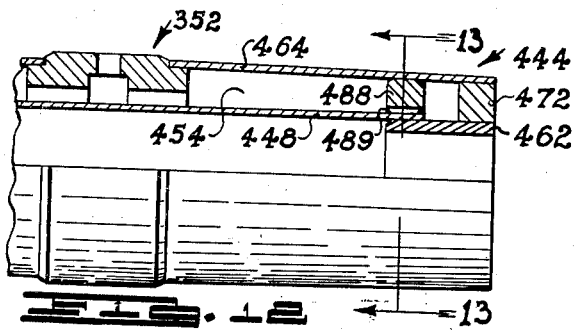
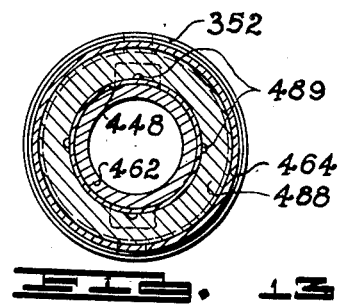
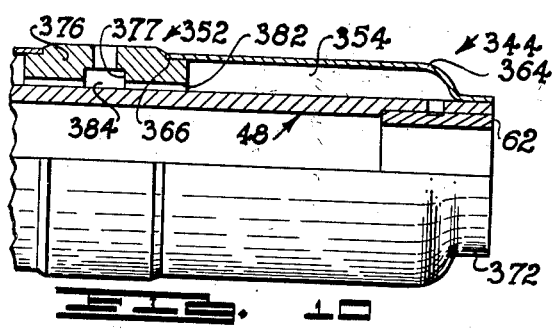
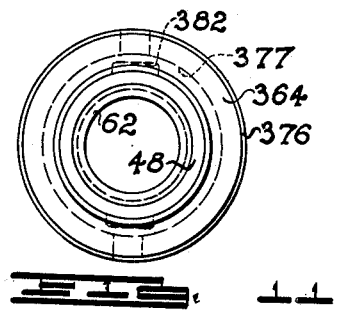
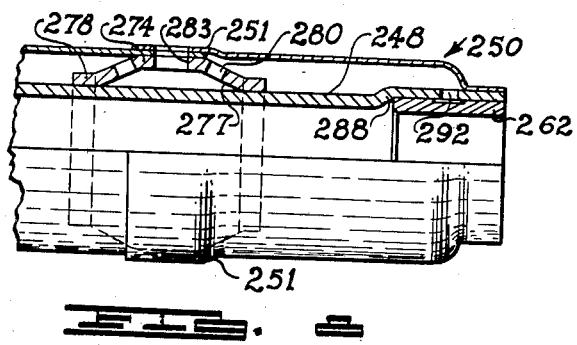
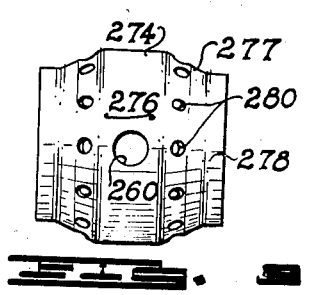
NILS ERIK WAHLBERG
JOSEPH F. SLADKY
WALLACE S. BERRY
BY Carl J. Barbee
THEIR ATTORNEY Patented Mar. 30, 1943

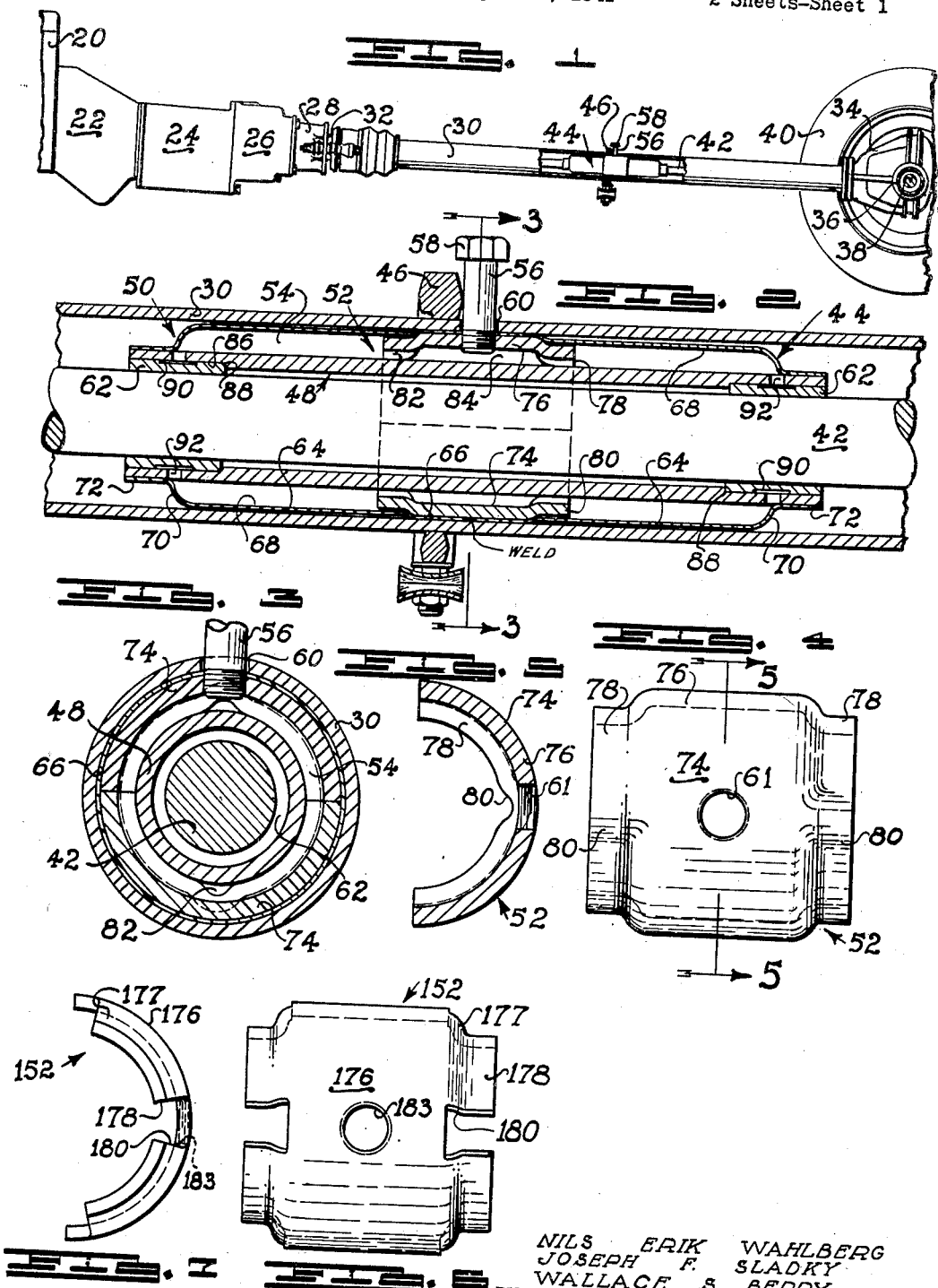

2,315,467

UNITED STATES PATENT OFFICE 2,315,467

DRIVE SHAFT CENTER BEARING

Nils Erik Wahlberg and Wallace S. Berry, Kenosha, and Joseph F. Sladky, Racine, Wis., assignors to Nash-Kelvinator Corporation, Kenosha, Wis., a corporation of Maryland Application September 11, 1941, Serial No. 410,400

9 Claims. (Cl. 308—65)

This invention relates to bearings for supporting the center portion of a shaft within a tubular housing and has particular reference to a bearing for supporting the drive shaft of an automotive vehicle within the drive shaft tube of the vehicle.

It is an object of this invention to provide a bearing assembly which is easily installed within the drive shaft tube of the automobile and which supports the drive shaft within the tube along a considerable length of the shaft.

It is another object of this invention to provide a bearing which will be lighter than similar bearings known heretofore.

It is another object of this invention to provide a bearing which may be assembled from stamped and drawn stock.

It is another object of this invention to provide a bearing which will retain a considerable volume of oil for lubricating the bearing surfaces between the shaft and the bearing.

It is another object of this invention to provide a bearing having an oil storage reservoir through which oil may easily flow to all bearing surfaces.

Other objects and advantages of this invention will be apparent from a consideration of the following description and claims and the attached drawings, of which there are two sheets, and in which—

Figure 1 represents a side elevation partially broken away of the driving unit of an automotive vehicle;

Figure 2 represents an enlarged vertical sectional view through the bearing illustrated in Figure 1;

Figure 3 represents a transverse sectional view taken along a plane indicated by the line 3—3 in Figure 2 and looking in the direction of the arrows;

Figure 4 represents a plan view of the top half of the center spacing member illustrated in Figures 2 and 3;

Figure 5 represents a sectional view taken along a plane indicated by the line 5—5 in Figure 4 and looking in the direction of the arrows;

Figure 6 represents a plan view of the top half of a modified form of a spacing member similar to that shown in Figure 4;

Figure 7 represents an end elevation of the spacer member illustrated in Figure 6;

Figure 8 represents an elevational view partially in section of a modified form of the bearing illustrated in Figures 1 and 3;

Figure 9 represents a plan view of the top half of the spacer member illustrated in Figure 8;

Figure 10 represents an elevational view partially in section of a further modified type of bearing assembly;

Figure 11 represents an end elevation of the bearing illustrated in Figure 10;

Figure 12 represents an elevational view partially in section of a still further modified type of bearing;

Figure 13 represents a sectional view taken along a plane indicated by the line 13—13 in Figure 12 and looking in the direction of the arrows;

Figure 14 represents an elevational view partially in section of another modified form of the bearing illustrated in Figures 1, 2 and 3; and Figure 15 represents a sectional view taken along a plane indicated by the line 15—15 in Figure 14 and looking in the direction of the arrows.

Figure 1 illustrates a portion of an automotive engine 20 having a clutch housing 22, transmission 24 and overdrive unit 26 mounted on the rear end thereof. Secured to the rear face of the overdrive unit 26 is a cylindrical housing 28 which surrounds the tail shaft of the overdrive unit and to which the forward end of the drive shaft tube 30 is attached by means of the bolts 32. The connection between the drive shaft tube 30 and housing 28 is more particularly described and claimed in a co-pending application for Torque tube drive, Serial No. 336,604, filed May 22, 1940, in the name of Nils Erik Wahlberg.

The rear end of the drive shaft tube 30 is rigidly secured to a differential housing 34 from which the rear axle housings 36 containing the axles 38 extend transversely of the automobile. The usual road wheels 40 are carried upon the outer ends of the axles 38. The drive shaft tube serves to enclose the drive shaft 42 which is operatively connected between the differential gearing within the housing 34 and the tail shaft of the overdrive unit. The tube also transmits driving and braking thrusts from the wheels 40 to the motor 20.

As was more particularly described and claimed in another co-pending application for a Bearing, Serial No. 328,198, filed April 6, 1940, in the name of Joseph F. Sladky, now United States Letters Patent No. 2,293,313, dated August 18, 1942, the center portion of the drive shaft 42 must be supported within the drive shaft tube to prevent undesirable whip and vibration in the drive shaft. In order that the bearing may be easily installed in the drive shaft tube, it is desirable that the bearing shall have as little contact as possible with the inside surface of the tube so that there will be little friction to overcome in forcing the bearing into the tube. In order to support as great a length of the drive shaft as possible, it is desirable that the bearing surfaces of the bearing assembly be positioned along as great a length of the shaft as is possible. The above co-pending application for a Bearing, Serial No. 328,198, filed April 6, 1940, now United States Letters Patent No. 2,293,313, dated August 18, 1942, discloses such a bearing consisting of a housing engaged with the inside surface of the drive shaft tube along a short distance of its center portion while the bearing surfaces for the shaft are positioned in each end of the housing. This invention deals with an improved form of the bearing described and claimed in the last mentioned application, Serial No. 328,198, such a bearing being illustrated generally at 44. A clamp 46 for clamping the walls of the drive shaft tube is also provided.

The bearing consists of an inner tube generally indicated at 48 surrounded by an outer shell generally indicated at 50, the ends of which are sealed to the ends of the inner tube. The center portion of the outer shell 50 is spaced from the inner tube 48 by a spacer member generally indicated at 52 thus forming an annular cylindrical space 54 for storing lubricant within the shell 50. A pipe 56 and a cap 58 are passed through an aperture 60 in the tube 30 and through the outer shell 50 to a hole 61 tapped in the spacer member 52. The pipe 56 serves both as a filling spout for the reservoir 54 and as a locking pin for fixing the position of the bearing within the tube 30.

The ends of the inner tubular member 48 support the cylindrical sleeves 62 formed of anti-friction material which support the drive shaft 42 within the bearing 44 and tube 30.

More specifically the outer shell 50 consists of two identical cylindrical members 64 which are formed from relatively thin metal stock as by stamping or drawing in dies. The inner or adjacent ends of the cylindrical members 64 have a portion 66 of slightly enlarged diameter, the outside diameter of which is such that they will just slide within the tube 30. Toward the outer ends of the cylindrical members 64 is formed a relatively long portion 68 of slightly reduced diameter which provides ample clearance between the ends of the bearing and the inside of the tube 30. The outer ends of the cylindrical members 64 are reduced as at 70 and provided with cylindrical flanges 72 which fit tightly around the ends of the inner tube 48 and are secured thereto in a manner which will be described presently.

The spacer member 52 which spaces the inner ends of the cylindrical member 64 from the inner tube 48 consists of a stamping 74 preferably made in two halves which are later welded together. The stamping 74 has a central portion 76 of enlarged diameter which just fits within the enlarged ends 66 of the cylindrical members 64. The end portions 78 of the spacer member are of reduced diameter so as to fit tightly around the outer surface of the inner tube 48. The portion 78 of reduced diameter is pressed outwardly as at 80 to form slots 82 permitting communication between the annular space 54 at each end of the bearing and an annular space 84 formed between the inner tube 48 and the enlarged central portion 76 of the spacer member 52. It will be noted that the filler pipe 56 projects into the annular space 84 so that oil supplied through the pipe 56 will flow first through the annular space 84, then through the slots 82 to the annular space 54.

The inner surface of the inner tube 48 at the ends thereof is enlarged as at 86 thus forming a shoulder 88 against which the bearing sleeves 62 may be pressed. The outer surfaces of the bearing sleeves are provided with an annular groove 90 thus forming an annular oil space which is supplied with oil from the space 54 through the holes 92 formed in the walls of the inner tube 48. The bearing sleeves 62 are preferably made of porous anti-friction material so that oil will seep through them from the annular grooves 90 to the inner bearing surfaces.

In assembling the bearing, the two halves 74 of the spacer member 52 are first welded together to form the cylindrical spacer. The spacer 52 may then be secured to the center portion of the inner tube 48 as by welding, after which the two cylindrical members 64 of the outer shell 50 may be pressed over the spacer member 52 and the ends of the inner tube 48 until the end flanges 72 are flush with the ends of the inner tube 48 and the adjacent ends of the cylindrical members 64 and abutting against each other around the spacer 52. The bearing may then be sealed by welding the adjacent ends of the cylindrical members 64 and by welding the flanges 72 to the ends of the inner tube 48. A convenient method for welding these members is by the hydrogen weld process in which bands of copper or copper paint are applied along the edges which are to be welded and the bearing assembly is then passed through a furnace and raised to a temperature which will melt the copper and seal the joints. After the inner tube 48 and outer shell 50 are thus joined together, the bearing sleeves 62 may be pressed into the ends of the inner tube and machined to the proper size.

It will be noted that the spacer member 52 may be inexpensively formed from small dies and that the outer sleeve 50 may be formed of light metal stock which is also easily drawn in dies and further that the two halves of the outer sleeve may be drawn from the same die. The bearing as a whole is completely sealed against oil leakage except through the bearing sleeves 62 where such leakage is desired and the bearing is relatively light due to the absence of a solid or cast part. The spacer member 52 supports the main load applied on the bearing from the inside surface of the drive shaft tube 30 while the inner tube 48 which is supported by the spacer member 52 supports the bearing sleeves 62 at widely spaced points along the shaft 42. The short length of contact between the bearing assembly and the inside of the drive shaft tube makes the bearing easy to install within the tube and further permits the bearing to be easily withdrawn for inspection or repair.

Figures 6 and 7 illustrate one half of a modified form of spacer member 152. As in the form illustrated in Figures 4 and 5, the spacer member 152 has a central portion 176 of enlarged diameter. The end flanges 178 are of reduced diameter and have their inner surfaces of such a diameter as to fit tightly around the outer surface of the inner tube 48. The end walls 177 which connect the central portion 176 and the end flanges 178 are cut away transversely as at 180 to form spaces through which oil may pass to reach the annular space 54. The cut away portions 180 extend across the adjacent parts of the flanges 178 and perform the same function as the outwardly raised portions 80 of the spacer member 52. One of the stampings 174 is provided with a tapped aperture 183 through which the pipe 56 may be passed. It will be noted that the spacer member 52 may be made up of stampings either like that shown in Figures 4 and 5 or like that shown in Figures 6 and 7.

The modified form of the bearing shown in Figures 8 and 9 consists of a two piece outer shell 250, the inner end of one half of the shell being enlarged slightly as at 251 to extend over the end of the other half in telescopic relationship. The spacer member 274 as in the other forms of the invention just described is made as a two piece stamping, each half of which consists of a cylindrical center portion 276 from the edges of which are formed the tapered side portions 277 defining the apertures 280. End flanges 278 of reduced diameter fit around the inner tube 248 and support the inner tube from the outer shell 250.

The inner tube 248 is provided with enlarged end portions at 288 which define the apertures 292. The enlarged ends 288 receive sleeves 262 of bearing material which function to support the drive shaft the same as the sleeves 92 shown in Figure 2. One half of the spacer member 276 defines an aperture 260 for receiving a pipe 56 in the same manner as is shown in Figure 2. The various parts shown in Figures 8 and 9 may be joined by the same hydrogen welding process described in connection with Figure 2.

In the modified form of the invention illustrated in Figures 10 and 11, the inner tube 48 is the same as that shown in Figures 2 and 3 and supports the same bearing sleeves 62. However, the spacer member 352 consists of an annular ring 376 of solid cross section on the inside of which is cut an annular groove 377 which forms the annular space 384 around the inner tube 48. At points spaced around the spacer members 52, longitudinally extending internal grooves 382 are cut which provide communication between the annular space 384 and the space 354 between the outside of the inner tube and the outer shell 344.

The outer shell 344 consists of two similar tubular stampings 364 having outer ends 372 of reduced diameter which fit around the ends of the inner tube 48 and having inner ends which fit over shoulders 366 cut around the outer surface of the spacer member 352. The various parts are joined by the hydrogen weld process. With the construction shown in Figures 10 and 11, the halves of the outer shell 344 are alike on their inner ends and have only two diameters, thus reducing the number of forming or drawing operations required to form them.

The modified form of the invention shown in Figures 12 and 13 consists of a center spacer member 352 which is the same in all respects as that shown in Figures 10 and 11. However, the outer shell 444 consists of tapered cylindrical members 464 having straight sides which require less drawing than the outer shells shown in the other forms of the invention. The outer shell 444 is of slightly heavier gauged material than in the other forms of the invention as it supports the bearing sleeves 462 to a greater extent as will be explained presently.

The inner tube 448 is secured within the center spacer member 352 in the same fashion as shown in Figures 10 and 11 but does not extend completely to the ends of the outer sleeve 444. An inner end ring 488 is provided between the ends of the inner tube 448 and the inside of the outer sleeve 444 to support the outer ends of the inner tube. A series of notches 489 are cut in the internal surface of the end rings 488 so that oil may pass therethrough from the annular space 454 to the cylindrical bearing sleeves 462 which are pressed into the ends of the inner tube 448. The outer ends of the bearing sleeves 462 are supported from the outer ends of the sleeve 444 by annular end rings 472 which also prevent the oil which passes through the notches 489 from escaping from the bearing assembly. The outer end rings 472 are spaced from the inner rings 488 so that the midportion of the bearing rings 462 will flood with oil from the annular space 454.

This latter form of the invention has the advantage of requiring less complicated shaping operations in forming the outer shell members 464 and the center spacer member. It may also be sealed and joined together by the hydrogen weld process.

The modified form of the invention shown in Figures 14 and 15 consists of a central spacer member 552 of solid cross section similar to that shown in Figures 10 and 12 and which is provided with external shoulders 566 around which the central ends of the outer shell members 464 are received. The inner tubular member 48 around which the central spacer member 552 is positioned is the same as that disclosed in Figures 2 and 10 and supports the same bearing sleeves 62 at its ends while the outer shell members 464 are the same as those shown in Figures 12 and 13.

The outer sleeves 464 are generally cylindrical but are slightly tapered having no reduced outer ends, the space between the outer ends of the inner tube 48 and the outer sleeves 464 being closed by annular rings 572. The rings 572 are provided with shoulders 573 of the same diameter as the inside diameter of the outer sleeves 464. Flanges 575 prevent the end rings 572 from being pressed into the outer sleeves 464 beyond the ends of the inner tube 48. Attention is called to the fact that annular undercut grooves 577 are cut in the shoulders 573 and 566 of the end rings 572 and the center spacer member 552 respectively within which copper wire may be positioned on assembling the bearing prior to the hydrogen welding process described in connection with the assembly of the bearing shown in Figure 2.

While we have described our invention in some detail, we intend this description to be an example only and not as a limitation of our invention, to which we make the following claims:

1. A bearing assembly comprising a shell, a hollow inner member positioned within said shell, means sealing the ends of said shell to the ends of said inner member, a spacer member supporting the center of said shell in spaced relationship with respect to the center of said inner member, and bearing sleeves supported in the ends of said inner member, said assembly having a center portion of cylindrical cross section, the diameter of said center portion being the largest cross section dimension of the assembly.

2. A bearing assembly comprising an inner tubular member, sleeves of anti-friction material carried by the ends of said tubular member, an outer sleeve positioned telescopically around said tubular member and having its ends sealed to said tubular member so as to define an annular reservoir between said tubular member and said outer sleeve, a cylindrical spacer member positioned between said sleeve and said tube and dividing said reservoir, said spacer member having a central portion of enlarged diameter in contact with said sleeve and end portions of reduced diameter in contact with said tube so as to form a second annular space between said spacer member and said tube, and means formed on said spacer member permitting communication between said first and second annular spaces.

3. A bearing assembly comprising an inner tubular member, sleeves of anti-friction material supported at the ends of said tubular member, an outer sleeve having its ends sealed to the ends of said tubular member and its central portion spaced from said tubular member to form an annular reservoir, a spacer ring extending between said tubular member and said sleeve in the middle of said bearing assembly and defining a second annular space located around the center of said tubular member, and means formed on said spacer member permitting communication between said second annular space and said annular reservoir.

4. A bearing assembly comprising a pair of similar outer shell members, an inner member positioned within said shell members and having its ends sealed to one end of each of said pair of shell members, said shell and inner members defining an annular reservoir, a spacer member supporting the adjacent ends of said shell members from said inner member and having a portion defining apertures between the ends of said reservoir, and bearing sleeves positioned in the ends of said inner member, the ends of said inner member defining apertures communicating between said reservoir and said bearing sleeves.

5. A bearing assembly comprising an outer sleeve having a central cylindrical portion, intermediate portions on each side of said central portion of slightly reduced diameter and end portions of further reduced diameter, an inner tube extending between said end portions and having cylindrical ends sealed thereto, the ends of said inner tube defining apertures communicating with the space formed between said inner tube and the intermediate portions of said outer shell, bearing sleeves of porous anti-friction material positioned in the ends of said inner tube and covering said apertures, and a spacer member having a central cylindrical portion engaging the inside of the central cylindrical portion of said outer shell and end portions of reduced diameter engaging the outside of said inner tube at points spaced from the center thereof.

6. A bearing assembly comprising an inner tubular member, sleeves of anti-friction material supported within the ends of said tubular member, a ring positioned around the center of said tubular member and having an annular groove cut on the inside thereof defining an annular space between said tube and said ring, grooves cut longitudinally along the inside surface of said ring and permitting communication between said annular space and the ends of said ring, annular shoulders formed around the outside of said ring on each end thereof, and sleeves having their adjacent ends sealed to said shoulders and their outer ends sealed to the ends of said tubular member.

7. A bearing assembly comprising an inner tubular member, sleeves of anti-friction material supported within the ends of said tubular member, an annular ring positioned around the center of said tubular member and defining an internal annular groove, longitudinally extending internal grooves in said ring permitting communication between said annular groove and the ends of said ring, exterior annular shoulders formed on said ring, cylindrical outer sleeves having their adjacent ends sealed to said annular shoulders, and annular end rings sealed between the outer ends of said sleeves and the outer ends of said tubular member.

8. In a bearing assembly, a pair of tubular shell members each having an end portion of reduced cylindrical diameter joined together with said reduced cylindrical ends spaced from one another, one end of one of said shell members being slightly enlarged and telescopically engaging the end of the other of said members, an inner tubular member extending through said shell members and sealed to the reduced end portions thereof, and anti-friction means carried at the ends of said inner tubular member.

9. A bearing assembly for supporting a shaft within a tube intermediate the ends of the tube comprising an inner tubular member of relatively heavy gauge material defining a series of apertures near each end thereof, sleeves of anti-friction material positioned within each end of said inner tubular member and covering said apertures, an outer sleeve of relatively light gauge material positioned telescopically about said inner tubular member and spaced radially therefrom along the midsection of said inner tubular member, means sealing the ends of said outer shell to the ends of said inner tubular member, and a spacer member of relatively heavy gauge material having a portion engaging the mid-section of said outer shell and spaced portions engaging said inner tubular member whereby the center of said outer shell is supported from said inner tubular member.

NILS ERIK WAHLBERG.
JOSEPH F. SLADKY.
WALLACE S. BERRY.